Oct. 17, 1961 V. G. SHARPE 3,005,088
REFRIGERATING APPARATUS
Filed May 28, 1957 2 Sheets-Sheet 1

INVENTOR.
Verlos G. Sharpe
BY Edwin L. Dybvig
HIS ATTORNEY

United States Patent Office 3,005,088
Patented Oct. 17, 1961

3,005,088
REFRIGERATING APPARATUS
Verlos G. Sharpe, Dayton, Ohio, assignor to General Motors Corporation, Detroit, Mich., a corporation of Delaware
Filed May 28, 1957, Ser. No. 662,178
3 Claims. (Cl. 240—4)

This invention relates to refrigerating apparatus and more particularly to an arrangement which makes it possible to utilize a fluorescent light mounted directly in the refrigerated space for illuminating the food storage compartment when the door of the refrigerator is opened.

The desirability of utilizing a fluorescent light for illuminating the interior of a refrigerator has long been recognized but the prior art type of low-cost, low voltage fluorescent lights and controls therefor do not respond quickly enough when the light bulbs or tubes are in a refrigerated space and therefore conventional fluorescent lights have not proven satisfactory for use in household refrigerators as they require too long a time for the light to come on after the usual door operated switch has closed the circuit to the lights.

It is an object of this invention to provide an improved circuit arrangement whereby a fluorescent light will light up substantially instantaneously upon energization of the light even though the light may be mounted in a refrigerated space.

It is an object of this invention to provide an arrangement wherein the cathodes of a fluorescent light tube or bulb are energized continuously so as to cause the lights to operate immediately upon opening the refrigerator door.

Still another object of this invention is to prevent condensation on the outer surface of a fluorescent light bulb when mounted in a refrigerated space.

Further objects and advantages of the present invention will be apparent from the following description, reference being had to the accompanying drawings, wherein preferred forms of the present invention are clearly shown.

Figure 1:
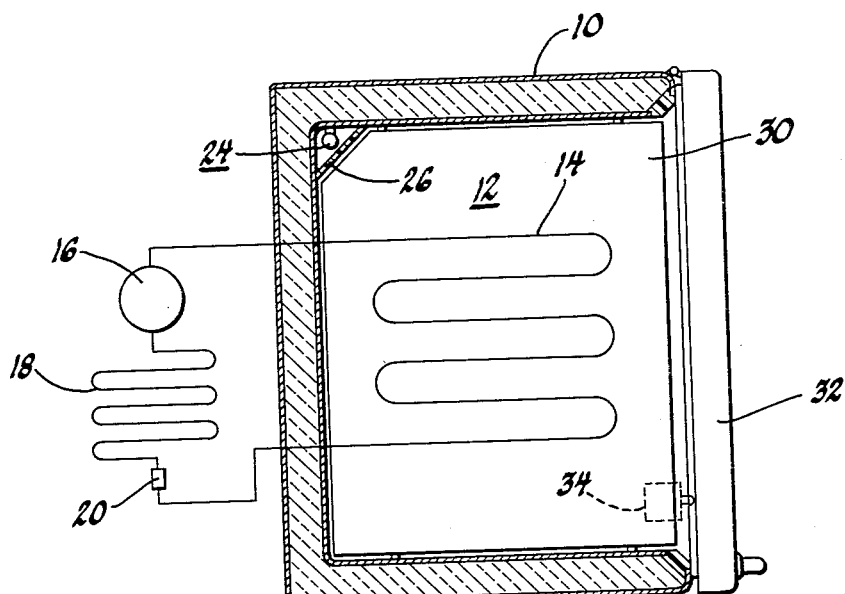
FIGURE 1 is a horizontal sectional view partly diagrammatic showing the invention applied to a household refrigerator.

Referring now to the drawings wherein preferred embodiments of the invention have been shown, reference numeral 10 generally designates a household refrigerator having a refrigerated food storage compartment 12 therein. The compartment 12 is refrigerated by means of a conventional refrigerating system which comprises an evaporator 14 which has its outlet connected to a conventional compressor 16 which in turn has its outlet connected to a conventional condenser 18. The refrigerant liquified in the condenser 18 is returned to the evaporator 14 through a conventional pressure regulating device 20. The refrigerating system just described is intended to represent a conventional system for cooling the food compartment 12.

Light for the food storage compartment 12 is provided by a conventional fluorescent lamp 24 which is preferably mounted in one corner of the refrigerator directly behind a transparent plastic shield 26 which protects the lamp 24 from being damaged by any jars or the light which may be placed on the food shelf 30. It will be noted that the one corner of the shelf 30 has been cut away so as to clear the plastic shield 26. The lamp 24 is preferably turned on and off in response to opening and closing of the main refrigerator door 32 and in order to accomplish this a door operated switch 34 is provided as shown which is adapted to close the circuit to the lamp when the door is opened.

It has long been recognized that fluorescent lights provide excellent illumination but it has also been recognized that conventional low-cost, low voltage fluorescent lights are slow to light up when the light bulb is maintained near or below freezing temperatures and for that reason they have never been used as door operated lights in household refrigerators to the best of applicant's knowledge. By providing the circuit arrangement shown in FIGURE 2, it is now possible to utilize a fluorescent lamp for illuminating the interior of a refrigerator and to have the lamp light up instantaneously upon opening the refrigerator door. In order to accomplish this, the cathodes 40 of the lamp 24 are adapted to be heated continuously with the result that the lamp will immediately light up when the usual energizing voltage is supplied across the cathodes. By heating the cathodes continuously there is less tendency for condensation on the outer surface of the bulb and this is an important feature in a refrigerator as moisture on the outside of a fluorescent bulb interferes with the proper operation of the lamp.

Figure 2:
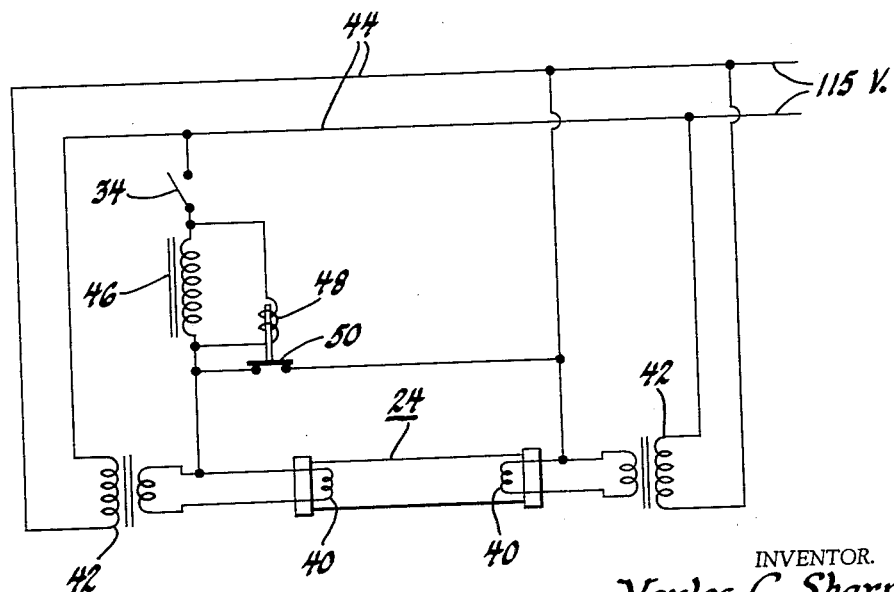
FIGURE 2 is a schematic wiring diagram showing the electrical circuits and controls for the fluorescent light.

As shown in FIGURE 2 of the drawing, a pair of transformers 42 which have their primaries connected directly across the 115 volt supply lines 44 serve to maintain the cathodes heated. It has been found that transformers which apply approximately 6 volts across the cathodes will serve the purpose. In the circuit shown in FIGURE 2, a conventional series choke ballast 46 is provided in series with the door switch 34 and a solenoid 48 is connected in parallel with the choke ballast 46 and serves, when energized, to open the starter switch 50 immediately upon closing of the door switch 34. By virtue of the above described circuit, when the switch 34 is first closed, current will flow through the choke ballast 46 and the solenoid 48 via the starter switch 50, but the instant the solenoid 48 becomes energized the switch 50 opens with the result that the only path for the current to take is that through the lamp 24.

Opening of the switch 50 causes an inductive surge to be applied across the cathodes 40 of the lamp 24 so as to cause the lamp 24 to become illuminated. It will be noted that if for any reason the lamp 24 does not illuminate, no current will flow through the solenoid 48 with the result that the switch 50 will reclose instantaneously so as to again cause energization of the ballast 46 and the solenoid 48 whereby the above described starting operation will be repeated.

The fluorescent lamp or bulb 24, the door operated switch 34, the ballest 46 and the refrigerating system shown are conventional well-known units, but the combination and arrangement of the parts makes it possible to provide greatly improved illumination which is not adversely affected by the low temperature surrounding the light.

Figure 3:
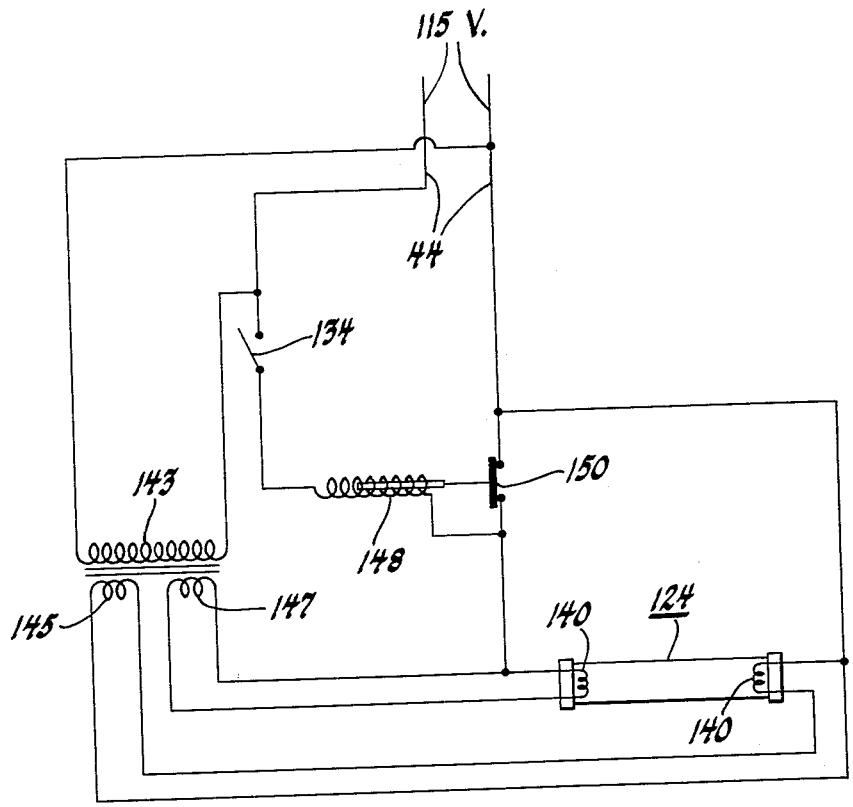
FIGURE 3 is a schematic wiring diagram showing a modified circuit arrangement.

In FIGURE 3 of the drawing, there is shown a modified circuit arrangement in which the parts have been given reference numerals which are one hundred higher than the reference numerals used to designate the corresponding parts in FIGURE 2 of the drawing. There are two principal differences between the circuits shown in FIGURES 2 and 3. The one difference resides in the transformer used for supplying current for heating the cathodes 140 of the lamp 124. In FIGURE 3, the primary 143 of the transformer is common to two secondary coils 145 and 147 which supply electrical energy to the cathodes 140 at a reduced voltage such as 6 volts. The second difference between the two circuits is that in the arrangement shown in FIGURE 3, a single coil 148 not only functions as an operator for the switch 150, but also serves as the sole series choke ballast for the lamp.

It will be noted that in both circuit arrangements the switches 50 and 150 serve to form a direct short across the lamp cathodes whenever the switches 50 and 150 are closed and that upon opening of each of the switches the resulting voltage surge is applied directly across the terminals of the lamp whereby the lamp will light up in accordance with well known principles.

While the forms of embodiment of the invention as herein disclosed constitute preferred forms, it is to be understood that other forms might be adopted, as may come within the scope of the claims which follow.

What is claimed is as follows:

1. In combination, a refrigerator having a refrigerated food storage compartment therein, a fluorescent lamp lighting system, a power source of a given voltage, a fluorescent lamp disposed in said compartment and including an elongated tube having a pair of cathodes located at opposite ends thereof, a pair of terminals connected to each of said cathodes, means including a transformer having its primary connected to said power source for supplying power to said terminals at a reduced voltage for continuously heating said cathodes, conductor means for connecting one terminal of each of said cathodes across said power source, means including a switch for providing a direct short between a terminal of one of said cathodes and a terminal of the other of said cathodes, and a solenoid in one of said conductor means having an armature arranged to open said switch upon energization of said solenoid.

2. In combination, a refrigerator having a refrigerated food storage compartment therein, a fluorescent lamp lighting system for lighting said compartment, a power source of a given voltage, a fluorescent lamp disposed in said compartment and including an elongated tube having a pair of cathodes located at opposite ends thereof, a pair of terminals connected to each of said cathodes, means including a transformer having its primary connected to said power source for supplying power to said terminals at a reduced voltage for continuously heating said cathodes, conductor means for connecting one terminal of each of said cathodes across said power source, means including a switch for providing a direct short between a terminal of one of said cathodes and a terminal of the other of said cathodes, and a solenoid in one of said conductor means having an armature arranged to open said switch upon energization of said solenoid, said solenoid serving as the sole ballast for limiting the flow of current through said lamp.

3. In combination; a refrigerator having an insulated food storage compartment therein; an access door for said compartment; apparatus to cool said compartment; a fluorescent lamp disposed in said compartment; said lamp comprising an elongated transparent tube having a pair of cathodes located at opposite ends thereof; means including a first switch operated in response to opening said door for applying a voltage across said cathodes to light said lamp; said means including a series choke ballast connected in series with said switch; and separate means for energizing said cathodes continuously whereby to provide for instantaneous lighting of said lamp upon opening of said door; said first named means including a solenoid arranged in parallel with said choke ballast, means including a second switch for short circuiting said cathodes, and means responsive to a predetermined flow of current through said solenoid for opening said second switch.

References Cited in the file of this patent

UNITED STATES PATENTS

| | | |
|---|---|---|
| 1,105,806 | Longstreth | Aug. 4, 1914 |
| 2,122,293 | Pleasant et al. | June 28, 1938 |
| 2,234,474 | Higham et al. | Mar. 11, 1941 |
| 2,294,623 | Lebrun | Sept. 1, 1942 |
| 2,339,085 | Luckiesh | Jan. 11, 1944 |
| 2,515,584 | Benson | July 18, 1950 |
| 2,523,020 | Hehenkamp et al. | Sept. 19, 1950 |
| 2,537,525 | Grindstaff et al. | Jan. 9, 1951 |
| 2,712,617 | Moerkens | July 5, 1955 |
| 2,737,781 | Gelfand et al. | Mar. 13, 1956 |
| 2,795,691 | Solley et al. | June 11, 1957 |
| 2,858,478 | Kershaw | Oct. 28, 1959 |